United States Patent [19]
Glotzel et al.

[11] Patent Number: 4,735,874
[45] Date of Patent: Apr. 5, 1988

[54] PROCESS FOR PRODUCING A GAS-TIGHT, SEALED ALKALINE BATTERY

[75] Inventors: Karl Glotzel, Castrop-Rauxel; Wolfgang Knabenbauer, Hagen; Dietrich Sprengel, Halver; Rudolf Tepel, Barsinghausen, all of Fed. Rep. of Germany

[73] Assignee: Varta Batterie Aktiengesellschaft, Hanover, Fed. Rep. of Germany

[21] Appl. No.: 914,819

[22] Filed: Oct. 3, 1986

Related U.S. Application Data

[62] Division of Ser. No. 727,845, Apr. 26, 1985, Pat. No. 4,643,959.

[30] Foreign Application Priority Data

May 7, 1984 [DE]  Fed. Rep. of Germany ....... 3416817

[51] Int. Cl.$^4$ .................. H01M 4/24; H01M 4/29
[52] U.S. Cl. ........................ 429/60; 29/623.1; 429/222; 204/2.1
[58] Field of Search ............ 29/623.1, 623.5; 429/60, 222, 48; 204/2.1

[56] References Cited

U.S. PATENT DOCUMENTS

| | | | |
|---|---|---|---|
| 456,370 | 1/1886 | Menard | 429/60 |
| 2,636,058 | 4/1953 | Newmann | 429/60 |
| 3,400,056 | 9/1968 | Hills | 429/222 |
| 3,449,167 | 6/1969 | Keel et al. | 204/2.1 |
| 4,275,127 | 6/1981 | Ritterman et al. | 429/60 |
| 4,378,301 | 3/1983 | Buder et al. | 429/60 |

*Primary Examiner*—Donald L. Walton
*Attorney, Agent, or Firm*—Weiser and Stapler

[57] ABSTRACT

The cell of a gas-tight alkaline battery is balanced by subdividing the negative excess capacity into the necessary charge and discharge reserves by individually treating the two electrode polarities prior to their assembly, while avoiding open cell forming. When combining a charged, dried, positive sintered electrode which is suitable for storage with a negative electrodeposited electrode, the latter inherently receives a charge reserve due to partial chemical oxidation with $H_2O_2$ 1 or $K_2S_2O_8$. When a discharged, but preformed positive sintered electrode is combined with a negative sintered electrode, the latter is electrochemically partially charged to the extent necessary to achieve the desired discharge reserve, and thereafter preserved by immersion in a solution containing sulfuric acid, and possibly $CdSO_4$.

14 Claims, No Drawings

PROCESS FOR PRODUCING A GAS-TIGHT, SEALED ALKALINE BATTERY

This is a division of application Ser. No. 727,845 filed Apr. 26, 1985, U.S. Pat. No. 4,643,959.

BACKGROUND OF THE INVENTION

The present invention generally pertains to a process for producing a gas-tight, sealed alkaline battery having a negative electrode whose excess capacity is subdivided into charge reserve and discharge reserve by pretreatment of the electrode outside of the cell.

In a battery operating under gas-tight conditions, the capacities of the positive and negative electrodes must be designed in such a way that both the required rated capacity of the cell, and operation of the cell during overload and high-current load, is guaranteed. To meet this requirement, suitable capacities are developed by selecting electrodes of different sizes, in such a way that they are, for example, in the following ratio to each other:

$$(+):(-)=1:1.5$$

This ratio is dependent, on an individual case basis, upon the special requirements which are to be imposed on the cell, for example, protection from overcharging. In addition, the drop in capacity of the negative electrodes, which is inevitable during operation, must be compensated.

A number of such processes are known. According to the majority of these processes the negative electrode is precharged in comparison with the positive electrode. The extent of this precharging corresponds to the desired discharge reserve. As an example, chemical reducing agents are suitable for this precharging. Thus, according to DE-OS No. 28 51 463, an electrolyte containing methanol, ethanol, or propanol as additives may be introduced into a cell equipped with partially discharged electrodes. According to U.S. Pat. Nos. 3,288,643 and 3,297,433, reducing agents such as aluminum powder or zinc powder may be mixed into a noncharged negative active mass to exert their specific action on the negative electrode, i.e. the reduction of a certain amount of $Cd(OH)_2$ into $Cd_{met}$. This provides a result which is similar to the above-mentioned alcohols, only in a sealed cell filled with electrolyte.

Other known process develop the negative excess capacity indirectly, via a special pretreatment of the positive electrode. Thus, according to DE-OS No. 30 26 073, part of the uncharged positive electrode mass is electrochemically reduced in hot KOH to metallic Ni before assembly with a completely discharged negative electrode. During charging of the resulting sealed cell, the electrochemical reduction is undone, such that charged cadmium in a quantity equivalent to the oxidized Ni is formed in the negative electrode. Since the $Ni \rightarrow Ni^{2+}$ transition linked with the formation of this $Cd_{met}$ is not reversed during subsequent operation of the cell, i.e. it is irreversible, the portion of Cd developed in the negative electrode is obtained as a discharge reserve after each exhaustive discharge of the cell. According to DE-PS No. 21 56 554, it is likewise possible to generate a discharge reserve, in an irreversible manner, by mixing the antipolar mass of an uncharged positive electrode with metallic zinc before installation, which zinc reduces part of the antipolar zinc mass after installation and after addition of the electrolyte, and by forming a discharge reserve in the negative electrode during subsequent charging, which discharge reserve corresponds to the reduced portion of the antipolar mass.

There are also processes, such as that according to FR-PS No. 21 15 704, in which the cell balance is set to correspond to the desired design ratio for the electrodes by charging and overcharging of the cell, while open and cold. Alternatively, it is possible to generate a discharge reserve by partial reduction of $Cd(OH)_2$ electrodes in a strongly reducing chemical bath (DE-OS No. 29 43 101), or by thermal decomposition of cadmium formate impregnating negative sintered electrodes (DE-OS No. 25 07 988).

However, the foregoing processes exhibit certain disadvantages in practice. In some, the desired capacity ratio is balanced only after start-up charging. The use of chemical substances to oxidize or to reduce the electrodes can create a problem in that the reaction products cannot be easily removed from the cell, adversely influencing the characteristics of the cell under electric load. The alkali mists discharged with the charging gases during the electrochemical setting of the cell balance are extremely troublesome. In addition, such processes have the disadvantage that the production process cannot be sufficiently automated because of considerable differences in the duration of the processing steps.

SUMMARY OF THE INVENTION

The present invention therefore has as its primary objective to provide for electrode treatment up to the point of installation, so that the cell is completely balanced concerning negative charge and discharge reserve after being sealed, and so that open forming of the cell is not needed.

This objective is accomplished according to the present invention by partially oxidizing the negative electrode to the extent necessary to develop a predetermined charge reserve, and by installing the resulting negative electrode in the cell of the battery in combination with a chafged positive electrode, and thereafter sealing the cell in gas-tight fashion after the addition of an electrolyte. In connection with a negative electrode produced by cathodic metal deposition from a cadmium salt solution, such partial oxidation is accomplished chemically, preferably with potassium peroxodisulfate or hydrogen peroxide. In connection with a negative cadmium electrode produced by sinter impregnation, such partial oxidation is accomplished as the electrode is partially charged, in connection with a preservation treatment in dilute sulfuric acid.

DETAILED DESCRIPTION OF PREFERRED EMBODIMENTS

For those electrical or chemical processing steps which are to be performed outside of the cell in order to set the cell balance, combining the positive electrodes either with a negative electrode prepared according to the so-called electro-deposit method (cathodic deposition of metal from cadmium salt solutions according to DE-OS No. 28 22 821), or with a negative sintered electrode, has proven to be especially advantageous. In the case of the former, the positive electrodes are always charged, while in the case of the latter, the positive electrodes are always discharged. As charged positive electrodes, pressed powder electrodes or electrodes from higher-grade nickel oxides, prepared by chemical preparative methods, can be used. However, sintered electrodes are especially advantageously used, and therefore are addressed in the following examples. The present invention is therefore best described in terms of two different electrode systems.

1. Positive electrode and negative electro-deposit electrode system.

In connection with this system, it has been determined that freshly charged (preferably seven hours with I =0.2 CA) positive sintered electrodes exhibit a good storage capacity and maintain at least 85% of their original discharge capacity with sufficient consistency, when washed after charging to remove all alkali and then dried rapidly at about 100° C. (about 15 minutes). It has further been determined that negative cadmium electrodes prepared in accordance with an electro-deposit process (such as that disclosed in DE-OS No. 28 22 821), have an average residual capacity (measured with I=1 CA) of 80% relative to the capacity of the first discharge cycle.

Investigations have shown that this residual capacity is based on a covering effect due to cadmium hydroxide, cadmium oxide or cadmium sulfate, rather than to a specific amount of dischargeable metallic cadmium. If such an electrode is charged with I≅1 CA without having been previously discharged, the amount of electricity that can be absorbed averages 8% relative to the capacity of the first discharge cycle. Therefore, if such an electrode is combined in a cell with a positive electrode as previously described, with an appropriate area or capacity ratio, it is not possible to develop a sufficient charge reserve without additional electrical or chemical treatment.

It is therefore necessary to reduce the residual capacity of the negative electrode, which reduction is carried out outside of the cell.

An especially advantageous means for reducing the residual capacity of the negative electrode, and thereby presetting the necessary charge reserve, is chemical oxidation with potassium peroxodisulfate $K_2S_2O_8$) or hydrogen peroxide ($H_2O_2$). These oxidations bring about a uniform discharge of the electrode at room temperature.

Hydrogen peroxide additionally offers the advantage that water, which can be completely removed, is formed during oxidation of the metallic cadmium according to:

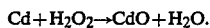

$$Cd + H_2O_2 \rightarrow CdO + H_2O.$$

Part of the water formed in this reaction evaporates immediately, so that only the remainder has to be removed in a subsequent drying step. The concentration range for the hydrogen peroxide is between 10 and 30 wt. % (preferably 20 wt. %). The yield of the oxidation reaction averages 90% with the use of 20% hydrogen peroxide and with the use of the electro-deposit electrodes up to their predetermined oxidation rate.

Electro-deposit electrodes which have been partially oxidized in this manner can be stored in air for a fairly long period of time without loss of residual capacity.

EXAMPLE 1

The following example compares an electrode which has been pretreated outside of the cell according to the present invention with a known electrochemical pretreatment, in terms of respective results in two experimental series using cells of the same type, and designed for a rated capacity of 500 mAh and a charge reserve of 250 mAh. Negative electro-deposit electrodes were used in both experimental series, however, the reference treatment corresponded to a known open forming treatment.

In accordance with the foregoing oxidation equation, 3.52 mg $H_2O_2$ per mAh of charge reserve to be introduced is theoretically needed for a treatment according to the present invention. In practice, 3.5 to 5 mg $H_2O_2$ should be used as a 10% to a 30% solution, and preferably as a 20% solution. The calculated amount of peroxide can either be applied on the finished electrode, or directly on the electrode strip during the production process.

The pretreated electrodes were wound in a dry state, installed into a cell cup, and welded. The cells were then sealed except for the valve hole. The necessary amount of electrolyte (here preferably KOH of a density of 1.30 g.cm$^{-3}$) was then added, and the cell sealed off with the valve.

After this step, the cells were completely ready to operate at a residual capacity of 90% of the rated capacity, measured under a load of I=1 CA. Table 1 shows some of the electrical characteristics exhibited.

TABLE 1

Series (1): open start-up
Series (2): pretreated by the process according to the present invention

| | |
|---|---|
| Residual capacity | (1) — |
| | (2) x = 460 mAh |
| Charge voltage after charging for 24 hours, at I = 0.33 CA | (1) x = 1.53 V |
| | (2) x = 1.49 V |
| Capacity during loading with I = 1 CA (0.95 V) | (1) x = 106% of rated capacity |
| | (2) x = 105% of rated capacity |
| Capacity during loading with I = 10 CA (0.75 V) | (1) x = 88% of rated capacity |
| | (2) x = 99% of rated capacity |

The advantage of the present invention is highlighted in these figures by a virtually unreduced rated capacity under the high loading of 10 CA.

2. Positive electrode and negative sintered electrode system.

Negative cadmium electrodes prepared according to a sinter impregnation process will generally undergo an oxidation when they are partly or fully charged, washed to remove all alkali, and then dried, even after only a short period of time. This oxidation is generally accompanied by the evolution of considerable amounts of heat. Thus, such electrodes are not able to be stored in air.

However, one successful method for providing a negative electrode with a sufficient discharge reserve prior to assembly is partial charging in connection with preservation. Such partially charged electrodes, e.g. for 15 minutes with a current of I=1 CA, are then washed to remove all alkali; treated according to the present invention with dilute sulfuric acid containing 20 to 80 g $H_2SO_4$/L, and preferably 50 g $H_2SO_4$/L, or a mixture of such sulfuric acid with cadmium sulfate in quantities of 5 to 50 g/L, and preferably 20 g/L for a short period of time (preferably 5 sec.); and subsequently dried at 100° C. Such electrodes can then be stored without oxidation.

Such negative cadmium electrodes, partially charged to the extent necessary to develop a predetermined discharge reserve, can then be installed in cells, according to the present invention, with discharged positive $Ni(OH)_2$ electrodes, which preferably are preformed.

After doping with electrolyte, the cells are sealed gas-tight, and are ready for use after charging (e.g. 24 hours at I=0.33 CA).

EXAMPLE 2

A sintered electrode produced in accordance with the present invention, as described above, was compared with an electrode produced in accordance with known open-forming processing techniques, again in two experimental series using cells with a rated capacity of 1.2 Ah. Table 2 shows some of the electrical characteristics exhibited.

TABLE 2

Series (1): open start-up
Series (2): pretreated by the process according to the present invention

| | |
|---|---|
| Charge voltage after charging for 24 hours, at I = 0.33 CA | (1) x = 1.50 V<br>(2) x = 1.46 V |
| Capacity during loading with I = 1 CA (0.95 V) | (1) x = 110% of rated capacity<br>(2) x = 116% of rated capacity |
| Capacity during loading with I = 5 CA (0.85 V) | (1) x = 85% of rated capacity<br>(2) x = 106% of rated capacity |

Thus, an appropriate useful capacity or charge/discharge reserve can be imparted to the positive or negative electrode of an alkaline battery, especially an alkaline nickel-cadmium battery, by means of the process according to the present invention. This makes the start-up of yet unsealed cells unnecessary, and eliminates the disadvantages of a chemical or electrochemical charging process.

What is claimed is:

1. A process for producing a gas-tight, sealed alkaline cell having a negative excess capacity which is subdivided into a charge reserve and a discharge reserve by pretreatment of electrodes outside of the cell, comprising the steps of:
   preparing a negative electrode by means of sinter impregnation;
   partially charging the negative electrode to achieve a predetermined discharge reserve;
   washing the negative electrode to remove all alkali;
   treating the negative electrode with a sulfuric acid solution;
   drying the negative electrode;
   installing the negative electrode in the cell in combination with a discharged positive electrode;
   adding an electrolyte; and
   sealing the cell in gas-tight fashion.

2. The process of claim 1, wherein the negative sintered electrode is precharged with a current of about 1 CA to the predetermined discharge reserve, and the sulfuric acid solution for said aftertreatment contains 20 to 80 g $H_2SO_4$/L.

3. The process of claim 2, wherein the sulfuric acid soluton contains 50 g $H_2SO_4$/L.

4. The process of claim 2, wherein the sulfuric acid solution additionally contains cadmium sulfate.

5. The process of claim 4, wherein the sulfuric acid solution contains between 5 and 50 g $CdSO_4$/L.

6. The process of claim 5, wherein the sulfuric acid and the cadmium sulfate are present in concentrations of about 50 g $H_2SO_4$/L and 20 g $CdSO_4$/L.

7. The process of claim 1, wherein the positive electrode is initially preformed.

8. The process of claim 1, wherein the positive electrode is a sintered electrode.

9. A gas-tight, sealed alkaline cell produced according to the process of claim 1.

10. The process of claim 1 wherein said treating with a sulfuric acid solution follows said washing.

11. A process for producing a negative electrode for a gas-tight, sealed alkaline cell having a negative excess capacity which is subdivided into a charge reserve and a discharge reserve by pretreatment of electrodes outside of the cell, comprising the steps of:
    preparing the electrode by means of sinter impregnation;
    partially charging the electrode to achieve a predetermined discharge reserve;
    washing the electrode to remove all alkali;
    treating the electrode with a sulfuric acid solution; and
    drying the electrode.

12. A negative electrode for a gas-tight, sealed alkaline cell, produced according to the process of claim 11.

13. The process of claim 11 wherein said treating with a sulfuric acid solution follows said washing.

14. A process for producing a gas-tight, sealed alkaline cell having a negative excess capacity which is subdivided into a charge reserve and a discharge reserve by pretreatment of electrodes outside of the cell, comprising the steps of:
    preparing a negative electrode by means of sinter impregnation;
    partially charging the prepared negative electrode to achieve a predetermined discharge reserve;
    washing the partially charged negative electrode to remove all alkali;
    treating the washed negative electrode with a sulfuric acid solution;
    drying the treated negative electrode; and thereafter
    installing the negative electrode in the cell in combination with a discharged positive electrode;
    adding an electrolyte; and
    sealing the cell in gas-tight fashion.

* * * * *